United States Patent [19]

Cohen

[11] Patent Number: 6,042,871
[45] Date of Patent: Mar. 28, 2000

[54] METHOD FOR PREPARING COOKED MEAT SLICES

[76] Inventor: M. Richard Cohen, 757 Highway 98 East, Suite 14-307, Destin, Fla. 32541

[21] Appl. No.: 09/190,977

[22] Filed: Nov. 12, 1998

[51] Int. Cl.⁷ .................................................... A23L 1/314
[52] U.S. Cl. ......................... 426/641; 426/518; 426/519; 426/523; 426/574
[58] Field of Search ..................................... 426/519, 642, 426/644, 645, 646, 647, 518, 523, 574

[56] References Cited

U.S. PATENT DOCUMENTS

| | | |
|---|---|---|
| 2,527,493 | 10/1950 | Condon .................................... 426/641 |
| 2,572,833 | 10/1951 | Balzarini . |
| 2,771,366 | 11/1956 | Shadid . |
| 3,934,050 | 1/1976 | Hawkins . |
| 4,294,860 | 10/1981 | Roth . |
| 4,614,489 | 9/1986 | Juravic . |
| 4,804,551 | 2/1989 | Matthews et al. . |
| 4,817,479 | 4/1989 | Perrine . |
| 4,867,994 | 9/1989 | Perrine . |
| 5,037,350 | 8/1991 | Richardson et al. . |
| 5,314,705 | 5/1994 | Hasson et al. ........................... 426/641 |

OTHER PUBLICATIONS

The Congressional Club Cook Book Thosmast. Morgan (p. 238), 1970.

Joy of Cooking (pp. 465–466) Irma S. Rombarnes Marion Komhauer Becker, 1986.

Catalog sheets entitled "B/H–14 Slice—Tact" and "B/H–15 Slice–N–Tact", Bettcher Industries, Inc., Vermilion, Ohio, 1985; 2 pages each (4 total).

Advertisement for Grasselli SL 400 and SL600 Boneless Meat Slicers, distributed in the United States by kinner Systems of Clark Summit, PA, undated, 1 page.

Disclosure Document No. 418164 filed Apr. 18, 1997.

*Primary Examiner*—David Lacey
*Assistant Examiner*—Hao Mai
*Attorney, Agent, or Firm*—Akin, Gump, Strauss, Hauer & Feld, L.L.P.

[57] ABSTRACT

A method for preparing cooked meat slices includes slicing larger portions of fresh meat into pluralities of slices in one pass of each portion through a multi-blade, automatic slicer. Slicing releases cell components which bind the slices together to form a loaf of meat slices. The loaf of bound together slices are thereafter simultaneously agitated and heated in a cooking liquid at an elevated temperature for a time sufficient to cause the slices to delaminate in the loaf and separate from one another. The slices may be left in the cooking liquid at the elevated temperature for a time sufficient to cook completely therethrough or may be removed from the first liquid for subsequent cooking at higher temperature. Subsequent cooking may occur in a second liquid or in a dry cooker such an oven or grill to more thoroughly brown the meat or in a dry cooker after partial cooking in a second liquid. The fresh meat may be marinated before cooking. Vacuum marination, preferably after slicing, allows maximum marinade liquid penetration in the shortest time. Although the method is designed particularly for beef slices used in steak sandwiches and the like, other meats may be processed in the same manner.

7 Claims, 1 Drawing Sheet

METHOD FOR PREPARING COOKED MEAT SLICES

BACKGROUND OF THE INVENTION

Steak sandwiches, such as Philadelphia style or "Philly" steak sandwiches, have become highly popular. Commercially, the beef steaks used in these sandwiches are generally supplied precooked.

The standard commercial process for providing precooked beef steak slices entails packing fresh beef chunks into boxes or metal pans to form molds of solid meat blocks. The meat chunk molds are frozen to a temperature of about minus 10° F. When needed, the molds are tempered, that is, allowed to warm to a temperature of about 28° F. for slicing. The meat must be frozen to firm the meat sufficiently throughout so that it can be handled by conventional, automatic meat slicers and keep frozen so the chunks remain together at least until sliced. The automatic meat slicers deposit a series of cut meat slices onto a conveyer which carries the separated slices into an oven or other "dry" cooker. The individual slices are cooked throughout. The cooked slices are then packaged for shipment.

The conventional process of preparing fully cooked beef slices suffers from high fixed and variable costs. An inventory of metal boxes/pans and cold storage facilities must be provided. The meat must be deeply frozen to firm the meat sufficiently throughout so that it can be handled by conventional, automatic meat-slicing equipment. Freezing takes one to two days. Tempering frozen meat takes another two to three days. Thus, significant amounts of meat must be maintained in inventory or delays will be incurred if the process is not begun until after orders are received. Even with quick or flash freezing, the above-described conventional process typically results in a shrunken and grey colored finished product because of damaging the cell structure and having a taste different from cooking fresh meat.

The foregoing conventional process is also very labor intensive. Meat must be manually placed into and removed from the boxes or pans which must also be cleaned and stored between uses. The meat is manually moved through various locations in a facility including into and out of freezers during the various processing stages.

Lastly, the conventional process is energy intensive. The energy costs of freezing and tempering the meat far exceed that of slicing and cooking it.

There is a need for a method which improves the quality of the final cooked, sliced meat product and which reduces the cost, time and equipment needed to provide such a cooked, sliced meat product.

BRIEF SUMMARY OF THE INVENTION

The invention is a method for preparing cooked meat slices comprising the steps of: slicing a chunk of fresh meat simultaneously into a plurality of adjoining slices such that the slices bind together into a loaf of meat slices; and simultaneously agitating and heating the loaf of bound together meat slices in a cooking liquid at elevated temperatures at least for a time sufficient to cause the meat slices of the loaf to delaminate thereby separating the meat slices of the loaf from one another.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
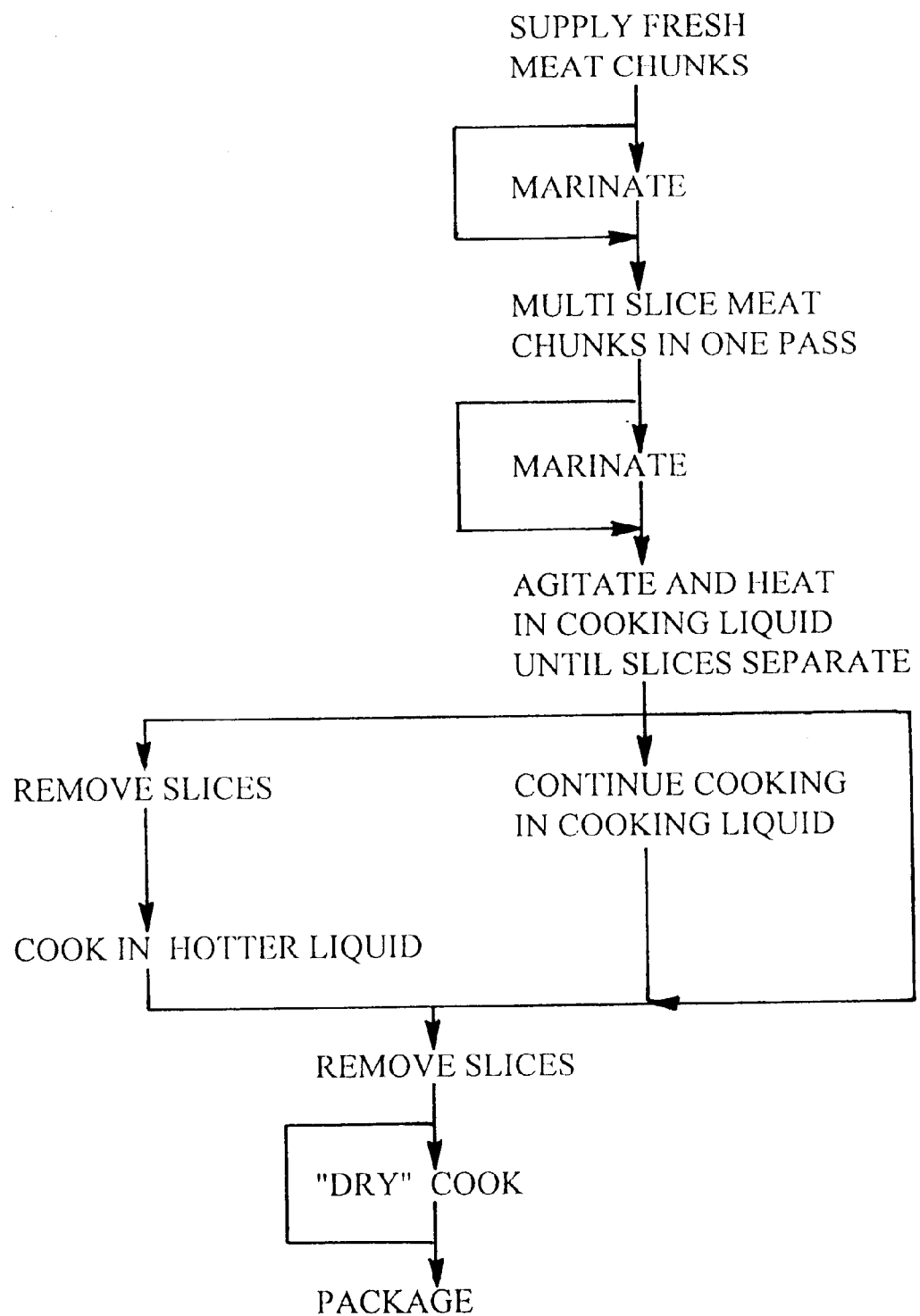
FIG. 1 is a block diagram of the various steps of the present method.

There is shown in FIG. 1, a block diagram of various steps of the method of the present invention for preparing precooked, sliced meat products. Central to the present method, fresh meat chunks, unfrozen but chilled to a temperature above freezing, are sliced into a plurality of uniformly thick slices in one pass through a multi-blade slicer. Slicing releases cellular components of the meat, including proteins such as myosin, at the cut surfaces of the slices. These components bind the slices together into a clump or loaf as they emerge from the slicer. If the loaf of bound together slices were cooked in this form in a conventional oven, it would cook from the outside in and the slices would have the finished taste of a roast beef instead of a uniformly cooked (e.g., grilled sandwich steak) product. The second main step of the present method is simultaneously heating and agitating the bound together meat slices at an elevated temperature and for a time sufficient to delaminate the bound together slices in the loaf and separate the slices from one another. This permits individual, separated slices to be used in subsequent cooking operations to substantially uniformly cook the slices throughout.

The slices could be cooked throughout in the cooking liquid at the first elevated temperature if left for a sufficiently long period of time. However, for faster processing, once the surface proteins are denatured and the slices separated from one another, the slices can be cooked more quickly at a higher temperature in or out of a cooking liquid. For example, the slices could be cooked in the original cooking liquid or further processed in another cooking liquid at a second, higher temperature or removed from the cooking liquid and "dry" cooked, for example, in an oven or grill, or partially cooked in a cooking liquid at a second, higher elevated temperature and removed and dry cooked. All three possibilities are indicated in FIG. 1. The completely cooked sliced meat product is then packaged for distribution.

An optional step which is enhanced by the use of fresh meat throughout the process is marinating the meat prior to cooking. This can be done while the meat is still in chunks or, more preferably, after it has been sliced. Slicing permits significantly greater and more uniform penetration of the marinade into the meat, even where the meat slices are still bound together. The meat may be marinated simply depositing the meat chunks or slices in a marinade liquid, however, for commercial operations, vacuum marinating is preferred. The meat (chunks or sliced) preferably is placed in a vacuum tumbler from which air is partially evacuated. Marinade liquid is introduced into the evacuated tumbler to cover the meat. The vacuum is released and the subsequent introduction of atmospheric pressure forces the liquid into the meat. Conventional liquid marinades are typically water based and include seasonings and additives such as phosphate(s) and starch(es) for better retention in the meat.

High speed, automatic meat slicers are used in the conventional process of preparing sandwich steak beef slices. These machines provide a continuous series of individual slices onto a conveyer for subsequent cooking. However, fresh beef cannot be fed sufficiently uniformly through such slicers to assure uniform slicing. Accordingly, the beef chunks have to be frozen to stiffen them sufficiently to be handled and uniformly sliced by such equipment. The bound together meat slices that are used in the present method might be provided from any source. However, for commercial applications, the fresh meat chunks used in the process are preferably sliced in specialized, multi-blade meat slicers, similar to bread slicers in operation, which include a hopper positioning the meat chunks over a multiplicity of parallel blades that reduce the beef chunks into multiple individual slices of uniform thickness in a single pass of the chunk through the slicer. Such automatic, multi-blade slicers may be obtained from Kasal Industries Inc. of Denver, Colo., which sells such slicers under the name "SLICE-N-TACT," and Grasselli S.p.A of Albinea (R.E.) Italy. For sandwich steaks, the meat slices are suggestedly less than 6 mm thick, desirably less than 4 mm thick and preferably between about 1.5 and 2 mm thick.

The step of simultaneously heating and agitating the bound together meat slices in a cooking liquid can be accomplished in any of several ways. After slicing, the bound together meat slices can be transported by hand or conveyer to a vessel of heated cooking liquid. Cooking liquids can include fat (e.g., lard, tallow), oil, water, brine and certain mixtures thereof.

The bound together slices can be agitated in the liquid by various ways. The slices can be agitated mechanically such as by paddles or blades or a screw moving through the liquid, or pneumatically such as by bubbling air or other gas(es) through the cooking liquid, or even electromagnetically by magnetic rotation of one or more stir bars. Also, a tubular cooking vessel rather than a vat or other cupped vessel may be provided and the bound together meat slices passed in a heated cooking liquid through the tubular vessel and simultaneously agitated by means of a screw.

The bound together meat slices are simultaneously heated and agitated in the cooking liquid at an elevated (e.g., above room) temperature for a time sufficient to cause the bound together meat slices of the loaf to delaminate, thereby separating the meat slices of the loaf from one another, preferably sufficiently separated to be collected as individual slices for subsequent processing. The slices have to be heated, preferably while being simultaneously agitated in the same cooking liquid, to denature the outer surfaces of the meat slices so as to prevent rebinding of the meat slices. In particular, the meat slices need to be heated sufficiently to denature cellular materials (e.g., myosin), which are released by slicing and present on the outer surfaces of the uncooked meat slices, at least sufficiently for delamination and separation of slices from the bound together loaves to occur. Preferably, the slices are cooked sufficiently after separation to fully denature their surfaces and prevent any rebinding during subsequent processing steps.

For beef steak cut to the preferred thickness of about 1.5 to 2 mm. thick, the meat can be agitated and heated at a temperature of about 120° to 130° F. in a continuous operation. Loaves of the bound together, sliced beef would be added to the vessel in a continuous fashion and allowed to cook at the indicated temperature until individual slices separated from one another and from the bound together loaves of slices to permit their individual collection for subsequent processing.

Sufficient agitation is desired to cause the bound together slices to separate from one another as their surface proteins denature. One of skill in this art will appreciate that such denaturing will occur from the outer surface of the bound together loaves of slices to the interior. Furthermore, sufficient agitation may be desired for the methods selected to suspend the individual slices in the cooking liquid in a way in which they can be more readily collected.

While batch processing may be employed, continuous processing is preferred for efficient commercial operation. In such processing, the slices would be removed from the initial heating and agitating vessel as soon as they separated. The separated slices may be carried by liquid flow to a second cooking location or to an area where they can be collected, preferably automatically collected with a screw or web conveyor, or further cooked while they are carried by the flow to a collection and removal area. The collected individual slices can then be moved to other locations for further cooking, packing or other treatment. For example, the slices may be moved to other equipment for heating at a second, higher temperature for complete cooking. This may be a separate vessel containing a cooking liquid at a second, higher temperature or a dry heating unit or both a second vessel and a dry heating unit. If a second cooking liquid is provided, suggestedly it has a maximum temperature at least 15° F. and more desirably 20° to 25° F. higher than that of the first cooking liquid, to more quickly cook the individual meat slices. The term "dry" heating is intended to cover all known forms of cooking sliced meat other than immersion in a liquid. It includes but is not limited to oven, microwave, grill, radiant and steam cooking.

After cooking, the slices may be portioned into containers for distribution or storage.

The method of the present invention produces beef slices of improved flavor and yield over that which has been conventionally available. Even after cooking in liquid, the beef slices tend to be browner in color than the more gray slices which result from using previously frozen beef. In addition, due to the ability to marinate the meat more thoroughly, particularly after it has been sliced, the yield of the final product (cooked weight versus original weight) is much higher than that provided by the conventional process which freezes the meat before cooking. The present invention provides major reductions in processing time and processing and labor costs, and the eliminates of all time and costs associated with freezing the meat prior to cooking.

While the invention has been described with respect to beef, other meats such as veal, pork, lamb, mutton, goat, buffalo and/or poultry and other might be precooked in the same manner.

It will be appreciated by those skilled in the art that changes could be made to the embodiments described above without departing from the broad inventive concept thereof. The loaf of bound together meat slices can be provided in other ways, for example, by stacking of individual slices cut by a conventional meat slicer or the lapping of extruded meat upon itself as it is being collected after extrusion. It is understood, therefore, that this invention is not limited to the particular embodiments disclosed, but it is intended to cover modifications within the spirit and scope of the present invention as defined by the appended claims.

I claim:

1. A method for preparing cooked meat slices comprising the steps of:

slicing a chunk of fresh meat simultaneously into a plurality of adjoining slices such that the slices bind together into a loaf of meat slices; and simultaneously agitating and heating the loaf of bound together meat slices in a cooking liquid at elevated temperature at least for a time sufficient to cause the meat slices of the loaf to delaminate thereby separating the meat slices of the loaf from one another.

2. The method according to claim 1 further comprising the step of cooking the separated meat slices at a second elevated temperature above the elevated temperature sufficiently to cook each of the meat slices therethrough.

3. The method of claim 2 further comprising the steps of:

removing separated slices of the meat from the cooking liquid; and further cooking the slices out of a liquid.

4. The method of claim 2 further comprising the steps of:

removing separated slices of the meat from the cooking liquid; and further cooking the slices in a second cooking liquid at a second elevated temperature above the elevated temperature of the cooking liquid.

5. The method of claim 4 further comprising the steps of:

removing the meat slices from the second cooking liquid; and further cooking the meat slices out of cooking liquid.

6. The method of claim 1, further comprising the step of vacuum marinating the fresh meat in a marinating solution prior to the step of sumultaneously heating and agitating the bound together meat slices.

7. The method of claim 1, wherein the step of heating further comprises heating the meat slices to denature cut surfaces of the meat slices sufficiently to prevent rebinding of the cut surfaces to one another after delamination and separation of the meat slices from the loaf.

\* \* \* \* \*